United States Patent [19]

Haugen et al.

[11] Patent Number: 5,005,892
[45] Date of Patent: Apr. 9, 1991

[54] RACK FOR BODY OF PICKUP TRUCK

[75] Inventors: Ronald E. Haugen; David T. Murphy, both of Forest City, Iowa

[73] Assignee: VIX Design Products, Inc., Forest City, Iowa

[21] Appl. No.: 522,654

[22] Filed: May 14, 1990

Related U.S. Application Data

[63] Continuation-in-part of Ser. No. 453,498, Dec. 20, 1989.

[51] Int. Cl.⁵ .............................................. B62D 33/00
[52] U.S. Cl. .......................................... 296/3; 403/298; 403/349
[58] Field of Search .................................. 296/3, 6, 10; 224/42.42; 403/298, 349, 292, 348

[56] References Cited

U.S. PATENT DOCUMENTS

| | | | |
|---|---|---|---|
| 2,947,566 | 8/1960 | Tower | 296/3 |
| 3,594,035 | 7/1971 | Ferguson | 296/3 |
| 4,211,448 | 7/1980 | Weston | 296/3 |
| 4,278,175 | 7/1981 | Jackson | 296/3 X |
| 4,405,170 | 9/1983 | Raya | 296/10 |
| 4,600,232 | 7/1986 | Phillips | 296/3 |
| 4,659,131 | 4/1987 | Flournoy | 296/3 |
| 4,779,916 | 10/1988 | Christie | 296/3 |

*Primary Examiner*—Robert R. Song
*Attorney, Agent, or Firm*—Burd, Bartz & Gutenkauf

[57] ABSTRACT

A rack assembly having a plurality of tubular members adapted to be mounted on a pickup truck box. The sides of the rack assembly taper upwardly and outwardly to increase accessibility to items contained in the truck box. A plurality of tubular joiners located within adjacent end sections of the tubular members releasably couple the members in end-to-end relationship. The outer surface of each joiner has a circumferential annular groove intersecting at least one longitudinal groove adapted to cooperate with an inwardly extended tab provided on one of the end sections to lock the tubular members together.

27 Claims, 3 Drawing Sheets

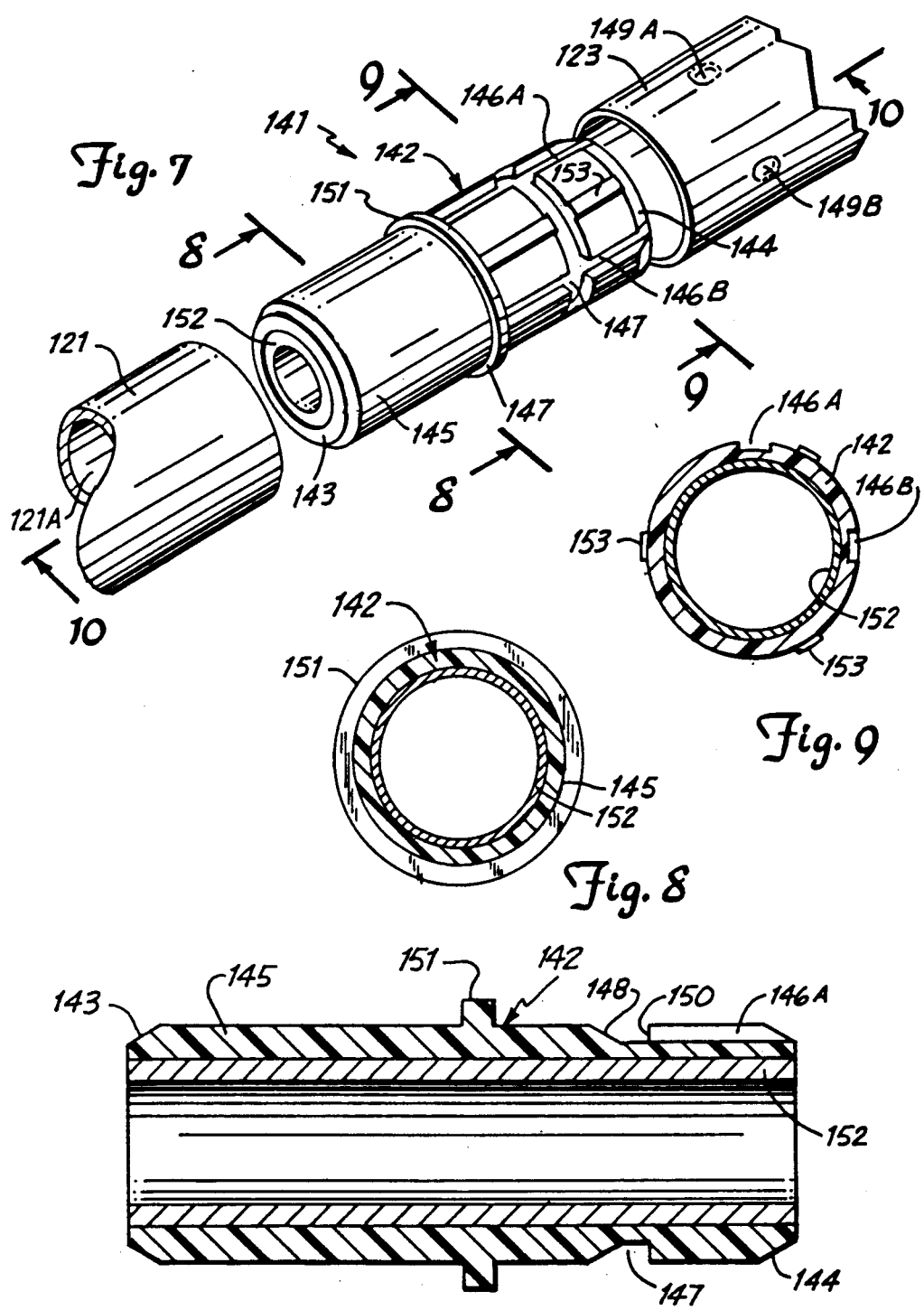

RACK FOR BODY OF PICKUP TRUCK

CROSS REFERENCE TO RELATED APPLICATION

This application is a continuation-in-part of U.S. Application Ser. No. 453,498 filed Dec. 20, 1989, now pending.

FIELD OF THE INVENTION

The invention relates to racks adapted to be mounted on a pickup truck to build up the sides of the box of the truck, and more particularly, to racks having tubular members assembled in end-to-end relationship.

BACKGROUND OF THE INVENTION

Prior racks have been adapted for installation on the cargo box of a pickup truck for utility purposes. These pickup truck racks have upright members secured to the side wall of the truck box that support longitudinal members and cross members extending between the tops of the upright members. Examples of these pickup truck racks are disclosed in U.S. Pat. No. 2,947,566, issued Aug. 2, 1960, to P. Tower, and U.S. Pat. No. 4,405,170, issued Sept. 20, 1983, to R. Raya.

A majority of prior pickup truck racks have been difficult to install, cumbersome to remove, and expensive to construct. Further, these racks have interfered with the use of and accessibility to the box area of the truck. Oftentimes, driver viewing through the rear window of the truck is obstructed by the racks.

SUMMARY OF THE INVENTION

The invention is directed to a rack assembly adapted to be mounted on the box of a pickup truck. The rack assembly has a plurality of tubular members releasably connected in end-to-end relationship. A tubular joiner is used to releasably mount adjacent tubular members together. The rack does not provide any obstruction of the load area of the truck box. Also, the rack does not obstruct the viewing through the rear window of the cab of the truck. The rack assembly is easily assembled and disassembled and can be adapted to fit different size truck boxes.

The preferred embodiment of the rack assembly of the invention comprises a first transverse tubular member supported on the top of the front area of the truck box with a pair of corner units. The lower ends of the corner units have plates or supports attached with bolts to the tops of the side walls of the truck box adjacent the cab. A second transverse tubular member is also supported on the corner units. Each corner unit has right angle tubular members joined to the transverse tubular members with joiners herein described. Corner units 13 and 15 each have right angle bent tubular members connected with a pair of second upright members. The first transverse tubular member is vertically spaced from the second transverse tubular member so as to not obstruct viewing through the rear window of the cab of the truck. The lengths of the transverse tubular members can vary to accommodate different size truck boxes. A pair of first tubular side members are secured to opposite ends of the first corner unit in end-to-end relationship. A pair of second tubular side members are secured to opposite ends of the second corner unit in end-to-end relationship. A pair of tubular end members are secured to rear ends of the first side members opposite the first corner unit in end-to-end relationship. Each end member is supported on the top of the truck box with upwardly and outwardly tapered legs so as to position the end members outwardly from the outer side surface of the truck box. The lower ends of the legs are secured to angle plates or supports attached with bolts to the tops of the side walls of the truck box. The end members have upwardly and forwardly inclined arms that are secured to the second side members and opposite ends of the second corner units in end-to-end relationship.

A plurality of generally tubular members or joiners are adapted to cooperate with adjacent end sections of the tubular members and corner units to secure the members and corner units in end-to-end relationship. The joiner are one-piece hard rubber or plastic tubular members. The rubber or plastic tubular members can be located over a metal sleeve to reinforce the joiner. Each joiner has an outer diameter substantially the same as the inner diameter of the tubular members of the rack whereby the joiner is located within the adjacent end sections of the tubular members in a tight or press fitting relationship. The outer surface of one end section of the joiner has an annular transverse or circumferential groove in communication with at least one longitudinal groove. The longitudinal groove extends normally from the circumferential groove to one end of the joiner. The joiner has beveled outer ends to facilitate the positioning of the joiner within the tubular members. One of the adjacent end sections of the tubular members has at least one inwardly directed tab adapted to be moved through the longitudinal groove so as to be positioned in the circumferential groove. The end section is rotated relative to the joiner so as to move the tab in the circumferential groove out of alignment with the longitudinal groove to prevent separation of the joiner from the tubular member. The joiner can be rotated relative to tubular member having the tab to locate the tab in the circumferential groove out of alignment with the longitudinal groove to prevent longitudinal movement of the joiner relative to the tubular member. The circumferential groove has an inclined bottom surface and an outer side surface that engage the tab to lock the joiner on the end section. The second end of the joiner is located in a tight press fitting relationship within the opposite end section to secure the tubular members in end-to-end relationship. The joiner has an outwardly projecting annular rib or collar that engages the outer ends of the adjacent end sections to ensure proper positioning of the joiner within the end sections and compensate for differences in internal sizes of the end sections of the adjacent tubular members. Also, the collar can be used to rotate the joiner to move the tab into or out of alignment with the longitudinal groove. The structure allows easy assembly and disassembly of the rack.

These and other advantages of the rack assembly of the invention are shown in the drawing and described in the following detailed description.

DESCRIPTION OF DRAWING

FIG. 7 is an exploded perspective view of adjacent end sections of tubular members and a modified joiner for locking the tubular members in end-to-end relationship.

FIG. 8 is an enlarged sectional view taken along line 8—8 of FIG. 7;

FIG. 9 is an enlarged sectional view taken along line 9—9 of FIG. 7; and

FIG. 10 is an enlarged sectional view taken along line 10—10 of FIG. 7.

DESCRIPTION OF PREFERRED EMBODIMENTS

Figure 1:
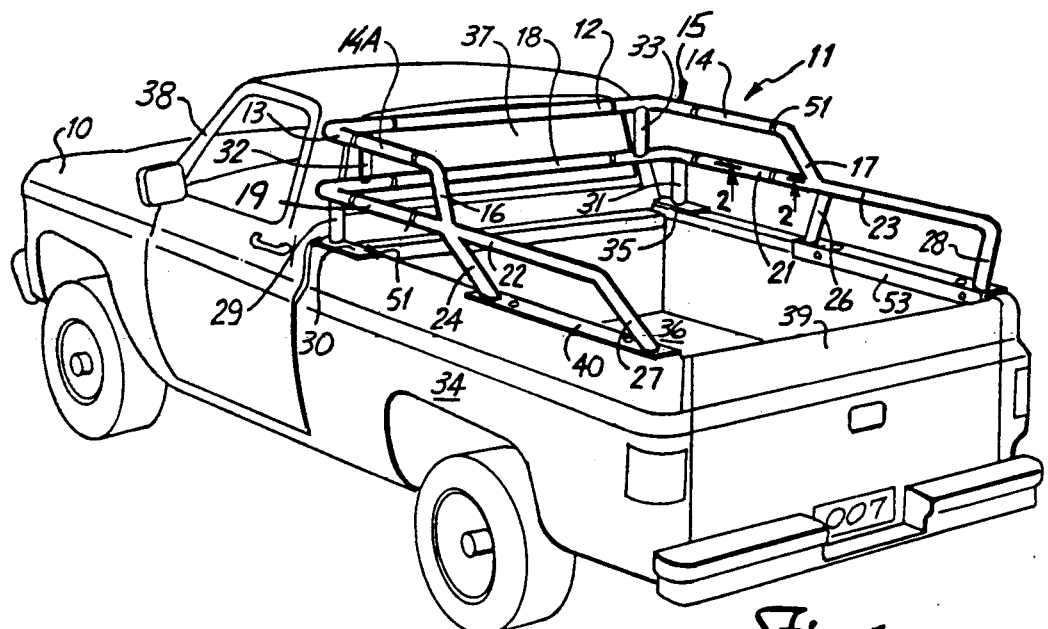
FIG. 1 is a perspective view of a rack assembly mounted on the box of a pickup truck.

Referring to FIG. 1, there is shown a rack assembly of the invention, indicated generally at 11 adapted to be mounted on the box of a pickup truck 10. Rack assembly 11 consists of a plurality of tubular members, such as metal or plastic tubes, that are easily assembled and disassembled. The inner diameter and the outer diameter dimensions of the tubular members of rack assembly 11 are identical. The tubular members can have differing inner and outer diameters. Rack assembly 11 can be adapted to fit different size truck boxes and be made of light weight tail tubes of pipe quality material that is easily broken down and shipped in a box. For example, rack assembly 11 can fit into a shipping box, twelve by twelve by fifty inches, and weighs less than seventy pounds. The sides of rack assembly 11 are tapered upwardly and outwardly to enable a tool box with its covers (not shown) to fit in the front part of the truck bed 36. Rack assembly 11 does not provide any obstruction of the load area of the truck bed 36 nor obstruct driver viewing through rear window 37 of the cab 38 of the truck.

Rack assembly 11 has a transverse upper rail 12 and a transverse lower rail 18 that extend horizontally across the front area of truck box 39. A pair of tubular corner units 13 and 15 having downwardly directed legs 29 and 31 secured to support plates 30 and 35 are connected with bolts (not shown) to the top of side walls 34 adjacent truck cab 38 to support rails 12 and 18 on truck box 39. Upper rail 12 and lower rail 18 are positioned generally parallel to each other above the front area, of truck box 39. Upright members 32 and 33 vertically space the right angle tubular members and rails 12 and 18 joined thereto so that the view through rear window 37 is not obstructed.

A first pair of tubular side rails 14 and 14A are joined in an end-to-end relationship to opposite ends of corner units 13 and 15 with joiners hereinafter described. Side rails 14 and 14A have substantially the same inner and outer diameters as the inner and outer diameters of the opposite ends of upper right angle tubular members of corner units 13 and 15. The opposite ends of corner units 13 and 15 are located generally above the top of the outsides of side walls 34 of the truck box 39 so that side rails 14 and 14A are positioned above side walls 34 of the truck box. A second pair of tubular side rails 19 and 21 are connected in end-to-end relationship to opposite ends of lower right angle tubular members of corner units 13 and 15 with joiners hereinafter described. The length of each side rail 19 and 21 is substantially the same as the length of each side rail 14 and 14A. The inner and outer diameters of side rails 19 and 21 are identical. The opposite ends of lower right angle tubular members of corner units 13 and 15 are turned rearwardly and positioned outwardly from and above the outer surface of side walls 34 thereby locating side rails 19 and 21 above and outwardly from side walls 34. This allows a tool box with its covers (not shown) to fit in the front area of truck bed 36.

Tubular end rails 22 and 23 are coupled in an end-to-end relationship to side rails 19 and 21 with joiners hereinafter described. End rails 22 and 23 and side rails 19 and 21 have substantially the same inner and outer diameters. Upwardly and outwardly inclined tubular legs 24 and 27 extend between truck side wall 34 and end rail 22 to hold the end rail 22 in linear alignment with side rail 19. A first elongated angle plate or support 40 is secured to the lower ends of legs 24 and 27 and the top of side wall 34 with a plurality of fasteners, such as bolts. End rail 22 is located upwardly and outwardly from the outer surface of left side wall 34 of the truck box. Similarly, tubular legs 26 and 28 angle upwardly and outwardly between side wall 34 and end rail 23 to support end rail 23 in linear alignment with side rail 21. This positions end rail 23 above and outwardly from right side wall 34 of the truck box. A second elongated angle plate or support 53 is secured by welds or the like to the lower ends of legs 24 and 27. A plurality of fasteners, such as bolts, attach angle plate 53 to the top of one side wall 34 of the truck box. End rails 22 and 23 do not interfere with the opening of tool boxes and the like located in truck box 39. Inclined tubular inverted L-shaped arms 16 and 17 extending upwardly and inwardly from end rails 22 and 23 are joined to side rails 14 and 14A, respectively. The front end sections of arms 16 and 17 are coupled with a joiner hereinafter described in end-to-end relationship with side rails 13 and 14.

Referring to FIGS. 2 to 5, there is shown a joint assembly indicated generally at 41 used to releasably couple adjacent end sections of tubular members and corner units 13 and 15 of rack assembly 11 in end-to-end relationship. Joint assembly 41 enables rack assembly 11 to be easily assembled and disassembled. The following description is directed to joint assembly 41 used to secure adjacent end sections of side rail 21 and end rail 23 in end-to-end relationship. The structure and function of the joint assemblies used to connect adjacent end sections of the rails and the rails to the corner units 13 and 15 are identical to joint assembly 41.

Figure 2:
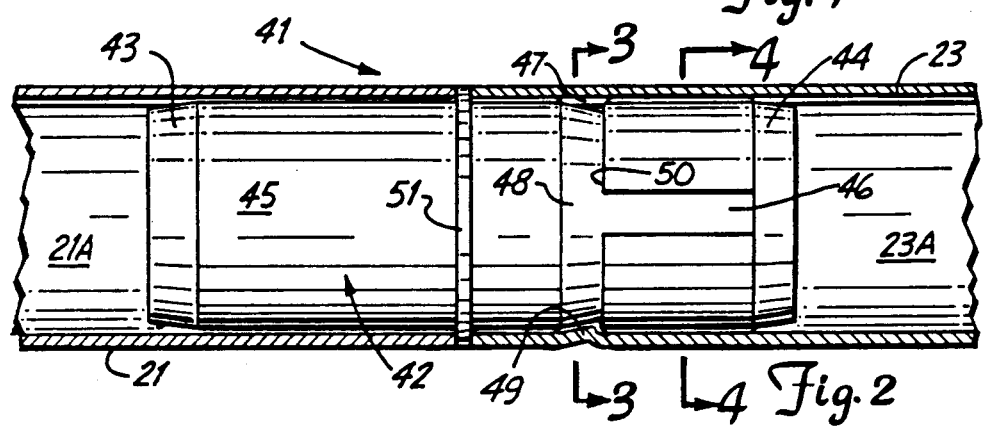
FIG. 2 is an enlarged sectional view taken along line 2—2 of FIG. 1.
Figure 3:
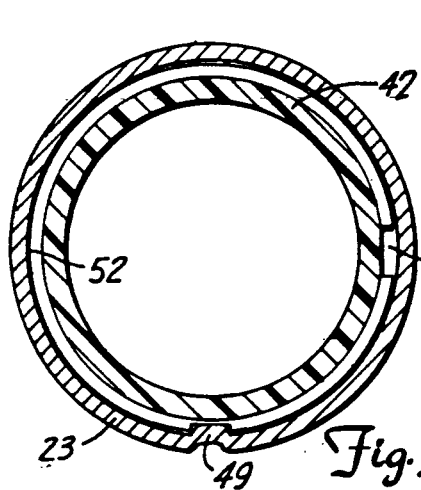
FIG. 3 is an enlarged sectional view taken along line 3—3 of FIG. 2.
Figure 4:
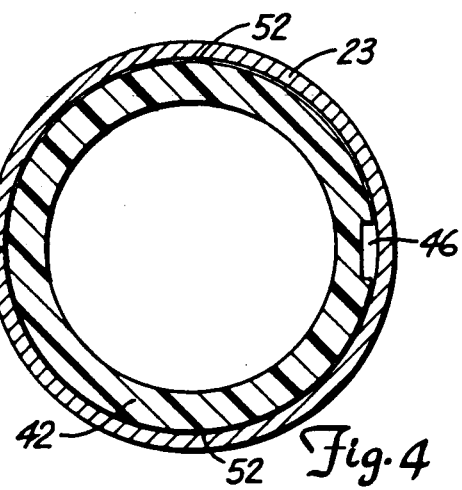
FIG. 4 is an enlarged sectional view taken along line 4—4 of FIG. 2.

As shown in FIGS. 2, 3 and 4, joint assembly 41 has a generally tubular insert or joiner 42 having inwardly inclined or beveled opposite end sections 43 and 44. Joiner 42 is a one-piece hard rubber or plastic member. The outer diameters of joiner 42 is substantially the same as the diameters of passages 21A and 23A of rails 21 and 23. The outer surface of joiner 42 has a longitudinal groove 46 that extends from end 44 to an annular or circumferential groove 47 provided in one end section of joiner 42. Groove 46 is generally normal to groove 47. Groove 47 has a bottom surface 48 that inclines downwardly toward end 44 and terminates at an annular radial shoulder or face 50. An annular rib or collar 51 projects outwardly from the outer surface of joiner 42 adjacent groove 47. Rib 51 is located in the center of joiner 42.

The outer surface of end 44 has a plurality of longitudinal radial ribs or flanges 52 adapted to engage the inner surface of rail 23 and take up tolerance of the rail. Flanges 52 are circumferentially spaced about end 44 and extend to rib 51.

End 43 of joiner 42 is telescoped into an end section of side rail 21. The diameter of passage 21A of side rail 21 is substantially the same as the outer diameter of cylindrical surface 45 of joiner 42 whereby the joiner 42 fits with a tight surface engagement within the passage 21A of rail 21. Joiner 42 is positioned into rail 21 so that the end of the rail 21 is flush with and engages collar 51. The outer diameter of collar 51 is the same as the outer diameter of rail 21 so that further movement of joiner 42 into passage 21A is restricted. An adhesive or bonding material can be used to secure end 43 to rail 21.

End 44 of joiner 42 is positioned in an end section of end rail 23. The diameter of passage 23A of end rail 23 is substantially the same as the outer diameter of joiner 42 so that the ribs 51 of joiner 42 are located within passage 23A in a tight fitting relationship to prevent relative lateral movement between joiner 42 and rail 23. A bottom portion of end rail 23 has an inwardly directed tab or projection 49 extended into groove 47. Tab 49 inclines upwardly and inwardly generally parallel to bottom inclined surface 48 of groove 47. Tab 49 is an indented portion of the wall of rail 21 extended inwardly toward the center of rail 21. Tab 49 can be a short finger having an inside surface and end locateable in groove 47. The inner end of tab 49 engages shoulder 50 to hold joiner 42 on end rail 23, as shown in FIG. 2. A plurality of tabs on rail 23 moveable through a plurality of longitudinal grooves into annular groove 47, as shown in FIG. 7, can be used to lock joiner 42 on rail 23. The outer diameter of end rail 23 is the same as the outer diameter of collar 51 whereby the end of rail 23 is flush with and engages collar 51. The linear distance between the end of rail 23 and tab 49 is identical to the linear distance between collar 51 and groove 47 so that when tab 49 is located in groove 47 the end of rail 23 engages collar 51.

Figure 5:
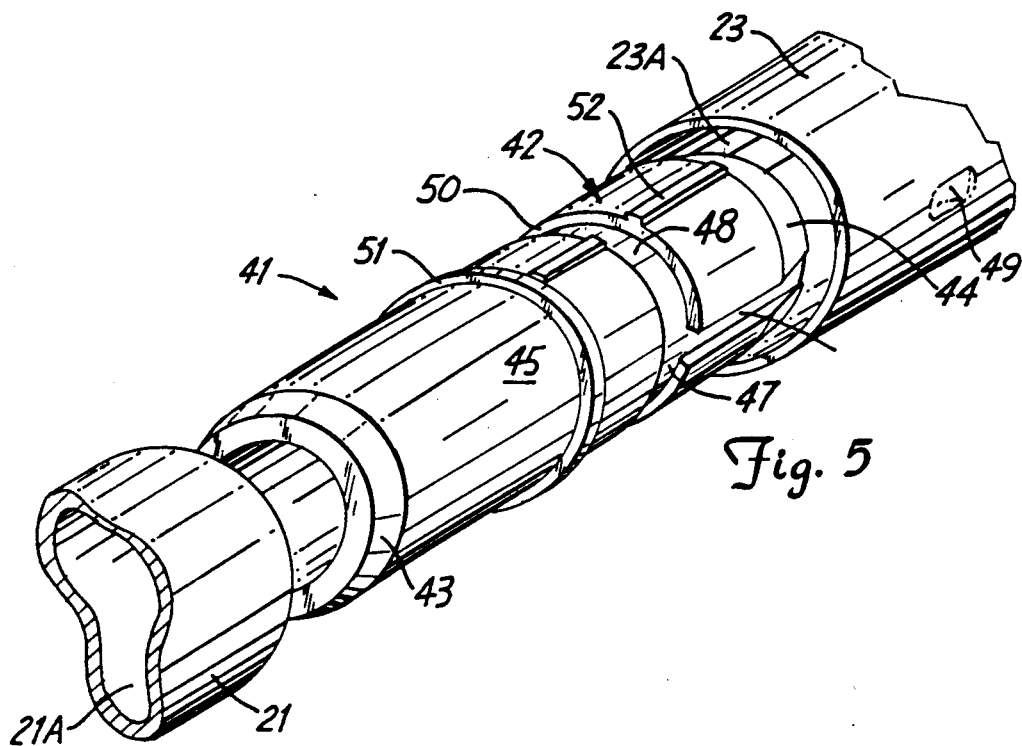
FIG. 5 is an exploded perspective view of adjacent end sections of tubular members and the joiner for locking the tubular members in end-to-end relationship.
Figure 6:
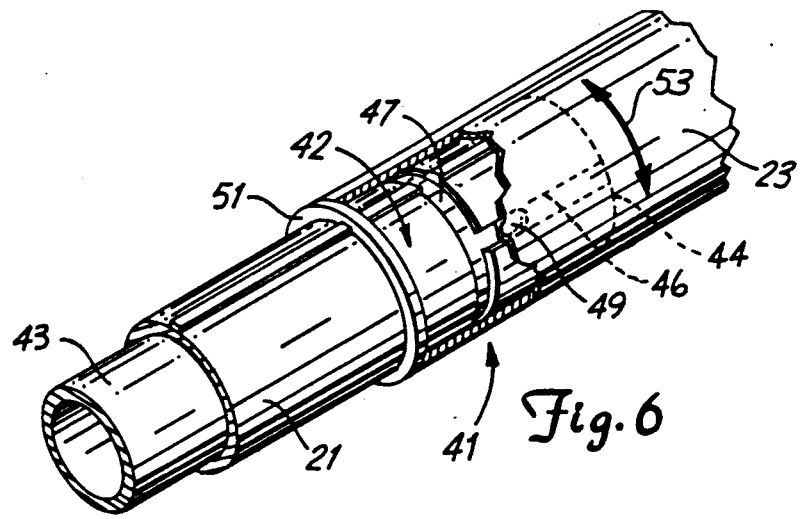
FIG. 6 is a perspective view, partly sectioned, showing the tubular members mounted on the joiner prior to relative rotation of the joiner and the tubular member having the tab.

In use, joiner 42 is inserted into passage 21A of side rail 21 and held therein in a tight fitting relationship. As shown in FIG. 5, rail 21 is moved into telescoping relation with cylindrical surface 45. Collar 51 engages the outer end of rail 21. Beveled end 43 facilitates the insertion of joiner 42 into rail passage 21A. The end of rail 23 is moved adjacent to beveled end 44 so as to align the passage 23A of the rail 23 with joiner 42. Beveled end 44 facilitates the positioning of joiner 42 relative to the end of rail 23. Rail 23 or joiner 42 is then rotated until tab 49 is aligned with longitudinal groove 46. This allows tab 49 to be moved through longitudinal groove 46 and into circumferential groove 47. As shown in FIG. 5, joiner 42 is inserted into passage 23A of rail 23 and held therein in a tight fitting relationship. Tab 49 moves through groove 46 into groove 47. Collar 51 engages the outer end of rail 23. As shown in FIG. 6, rail 23 is then rotated as indicated by arrow 53 in either a clockwise or a counterclockwise direction, thereby causing tab 49 to rotate in groove 47 and move out of alignment with groove 46 and into engagement with shoulder 50. This securely locks rail 23 on joiner 42 and joins adjacent end sections of rails 21 and 23 in end-to-end relationship. Tab 49 is normally located in the bottom of rail 23 when the rails 21 and 23 are secured together with joiner 42.

End 44 of joiner 42 can be inserted into passage 23A of end rail 23 and locked therein before end 43 is inserted into passage 21A of side rail 21. Also, collar 51 can be used to rotate joiner 42 relative to rail 23 to move tab 49 into or out of alignment with longitudinal groove 46.

Referring to FIGS. 7 to 10, there is shown a modification of the joint assembly indicated generally at 141 to releasably couple adjacent end sections of tubular members 121 and 123 together. Joint assembly 141 can be used throughout the rack assembly 11 to lock adjacent end sections of the rails together.

Joint assembly 141 has a generally tubular insert or joiner 142 having inwardly inclined or beveled opposite end sections 143 and 144. End section 144 also has a cylindrical outer surface 145 extended to and outwardly directed annular rib or collar 151. Cylindrical surface 145 has a diameter slightly larger than the internal diameter of the passage 121A of rail 120 so that rail 121 will telescope onto surface 145 in a tight fit relationship until the end of rail 121 butts against rib 151. The end section 144 of joiner 142 has a pair of longitudinal grooves 146A and 146B that extend from the outer end thereof to a circumferential or annular groove 147. As seen in FIG. 10, groove 147 has a inwardly inclined bottom surface 148 and an outwardly directed radial face or shoulder 150. As seen in FIG. 9, grooves 146A and 146B are angularly oriented about 90 degrees from each other. Other angular relationships between grooves 146A and 146B can be used. In addition, further longitudinal grooves can be incorporated into the joiner 142 that open to the circumferential groove 147.

Joiner 142 has an outer cylindrical member of hard rubber or plastic surrounding a metal tube or sleeve 152. Sleeve 152 reinforces the plastic material and insures a structural strength of the joint assembly 141.

Returning to FIG. 7, rail 123 has a pair of inwardly directed tabs or projections 149A and 149B longitudinally aligned with the grooves 146A and 146B and joiner 142. Tabs 149A and 149B are inwardly directed indentations in the wall of rail 123 and have the shape of the tab 49 as seen in FIG. 2.

In use, the rails 121 and 123 are locked together with joiner 142 by pressing the rail 121 onto the cylindrical surface 145 until the end of rail 121 butts against rib 151. Rail 123 longitudinally moves onto joiner 142 with the tabs 149A and 149B in longitudinal alignment with the grooves 146A and 146B. When the end of rail 123 butts against the rib 151, tabs 149A and 149B are located in the circumferential groove 147. Relative movement between joiner 142 and rail 143 will move tabs 149A and 149B out of longitudinal registration or alignment with grooves 146A and 146B, thereby locking the rail 123 onto joiner 142.

The outer surface of end 144 has a plurality of longitudinal radial ribs or flanges 153 adopted to engage the inner surface of rail 123. Flanges 153 are located between grooves 146A and 146B and extend to rib 151. When the end 144 is inserted into rail 123, flanges 153 are in tight frictional engagement with the inner surface of rail 123 to prevent relative lateral movement between joiner 142 and rail 123.

Rack assembly 11 is a light weight, relatively inexpensive, easily assembled framework that can be constructed to fit various sizes of boxes of different sized pick-up trucks. Rack assembly 11 does not interfere with rear window viewing. The upwardly and outwardly directed sides of rack assembly 11 increase accessibility to tool boxes and items contained in the truck box. Rack assembly 11 does not obstruct the rear load area of the truck box.

While there is shown and described several embodiments of the rack assembly of the invention, it is understood that changes in the structure and arrangement of structure can be made by those skilled in the art without departing from the invention. The invention is defined in the following claims.

We claim:

1. A rack assembly adapted to be mounted on the box of a pickup truck, said box having inside generally upright side walls, comprising: a first corner unit having first means adapted to be supported on a section of the box, a second corner unit having second means adapted to be supported on another section of the box, transverse tubular means extended between and connected to said first and second corner units, a pair of first tubular side members secured to the first corner unit located generally above and outwardly of one inside wall of the box, a pair of second tubular side members secured to the second corner unit located generally above and outwardly of the other inside wall of the box, a first tubular end member secured to one of the first side members opposite the first corner unit, a second tubular end member secured to one of the second side members opposite the second corner unit, first arm means secured to the other of the first side members opposite the first corner unit and the first tubular end member, second arm means secured to the other of the second side members opposite the second corner unit and the second tubular end member, first leg means supporting the first tubular end member on a first top section of the box second leg means supporting the second tubular end member on a second top section of the members to secure the members in end-to-end relationship and secure the transverse tubular means and first and second side members to the first and second corner units.

2. The assembly of claim 1 wherein: the joiner means comprises a plurality of generally cylindrical members adapted to be received within the adjacent end sections of the members.

3. The assembly of claim 2 wherein: each cylindrical member has an outer diameter length substantially the same as an inner diameter length of the members whereby the insert is located within the adjacent end sections in a tight fitting relationship.

4. The assembly of claim 2 wherein: each cylindrical member has an outer surface having an annular groove, one of the adjacent end sections having tab means adapted to be located in the annular groove to hold the cylindrical member on the one of the adjacent end sections.

5. The assembly of claim 4 wherein: the outer surface of the cylindrical member has at least one longitudinal groove extending from an end of the insert in communication with the annular groove, the tab means adapted to be moved through the longitudinal groove to be positioned in the annular groove whereby when the tab means is located in the annular groove and the one of the adjacent end sections is rotated relative to the cylindrical member, the tab means moves in the annular groove out of alignment with the longitudinal groove to hold the cylindrical member on the one of the adjacent end sections.

6. The assembly of claim 4 wherein: the annular groove has an inwardly inclined bottom surface and an outwardly directed shoulder, the tab means comprising an inwardly directed tab projection of a wall of the one of the adjacent end sections engageable with the bottom surface and the shoulder to hold the cylindrical member on the one of the adjacent end sections.

7. The assembly of claim 2 wherein: each cylindrical member has an outwardly projecting annular collar engageable with the adjacent end sections.

8. The assembly of claim 2 wherein: each cylindrical member has beveled outer ends.

9. The assembly of claim 1 wherein: each leg means comprises upwardly and outwardly inclined legs that support each end member outwardly from an inside side wall of the box.

10. The assembly of claim 9 wherein: each arm means comprises an upwardly and forwardly inclined arm.

11. The assembly of claim 1 wherein: the transverse tubular means comprises first and second members, said first member being vertically spaced from the second member so as to not obstruct viewing through a rear window of the truck.

12. The assembly of claim 1 wherein: the cylindrical member is a tubular member having a passage, and a sleeve located within the passage to reinforce the cylindrical member.

13. The assembly of claim 1 wherein: each cylindrical member has an outer surface having an annular groove and a plurality of longitudinal grooves open to the annular groove and an end of the cylindrical member, and one of said end sections of the members having tab means adapted to be moved through said longitudinal grooves into the annular groove whereby when the cylindrical member and the one of said end sections are rotated relative to each other the tab means move out of alignment with the longitudinal grooves to hold the cylindrical member on the one of said end sections.

14. The assembly of claim 13 wherein: the annular groove has an inwardly inclined bottom surface and an outwardly directed shoulder, the tab means comprising inwardly directed tab projections of a wall of the one of the adjacent end sections engageable with the bottom surface and the shoulder to hold the cylindrical member on the one of the adjacent end sections.

15. A rack assembly adapted to be mounted on the box of a pickup truck, said box having inside generally upright side walls comprising: a first corner unit having first means adapted to be supported on a section of the box, a second corner unit having second means adapted to be supported on another section of the box, transverse tubular means extended between and connected to said first and second corner units, first side member means secured to the first corner unit located generally above and outwardly of one inside wall of the box, second side member means secured to the second corner unit located generally above and outwardly of the inside wall of the box, a first end member secured to the first side member means opposite the first corner unit, a second end member secured to the second side member means opposite the second corner unit, first arm means secured to the first side member means opposite the first corner unit and the first tubular end member, second arm means secured to the second side member means opposite the second corner unit and the second tubular end member, first leg means supporting the first tubular end member on a first top section of the box, second leg means supporting the second tubular end member on a second top section of the box, and joiner means cooperating with adjacent end sections of the members to secure the members in end-to-end relationship and secure the transverse tubular means and first and second side members to the first and second corner units.

16. The assembly of claim 15 wherein: the joiner means comprises a plurality of generally cylindrical members adapted to be received within the adjacent end sections of the members.

17. The assembly of claim 16 wherein: each cylindrical member has an outer diameter length substantially the same as an inner diameter length of the members whereby the insert is located within the adjacent end sections in a tight fitting relationship.

18. The assembly of claim 16 wherein: each cylindrical member has an outer surface having an annular groove, one of the adjacent end sections having tab means adapted to be located in the annular groove to hold the cylindrical member on the one of the adjacent end sections.

19. The assembly of claim 18 wherein: the outer surface of the cylindrical member has at least one longitudinal groove extending from an end of the insert in communication with the annular groove, the tab means adapted to be moved through the longitudinal groove to be positioned in the annular groove whereby when the tab means is located in the annular groove and the end of the adjacent end sections is rotated relative to the cylindrical member, the tab means moves in the annular groove out of alignment with the longitudinal groove to hold the cylindrical member on the one of the adjacent end sections.

20. The assembly of claim 18 wherein: the annular groove has an inwardly inclined bottom surface and an outwardly directed shoulder, the tab means comprising an inwardly directed tab projection of a wall of the one of the adjacent end sections engageable with the bottom surface and the shoulder to hold the cylindrical member on the one of the adjacent end sections.

21. The assembly of claim 16 wherein: each cylindrical member has an outwardly projecting annular collar engageable with the adjacent end sections.

22. The assembly of claim 16 wherein: each cylindrical member has beveled outer ends.

23. The assembly of claim 15 wherein: each leg means comprises upwardly and outwardly inclined legs that support each end member outwardly from an inside side wall of the box.

24. The assembly of claim 15 wherein: the transverse tubular means comprises first and second members, said first member being vertically spaced from the second member so as to not obstruct viewing through a rear window of the truck.

25. The assembly of claim 15 wherein; the cylindrical member is a tubular member having a passage, and a sleeve located within the passage to reinforce the cylindrical member.

26. The assembly of claim 15 wherein; each cylindrical member has an outer surface having an annular groove and a plurality of longitudinal grooves open to the annular groove and an end of the cylindrical member, and one of said end sections of the members having tab means adapted to be moved through said longitudinal grooves into the annular groove whereby when the cylindrical member and the one of said end sections are rotated relative to each other the tab means move out of alignment with the longitudinal grooves to hold the cylindrical member on the one of said end sections.

27. The assembly of claim 26 wherein; the annular groove has an inwardly inclined bottom surface and an outwardly directed shoulder, the tab means comprising inwardly directed tab projections of a wall of the one of the adjacent end sections engageable with the bottom surface and the shoulder to hold the cylindrical member on the one of the adjacent end sections.

* * * * *